United States Patent
Jones et al.

(10) Patent No.: US 7,962,479 B2
(45) Date of Patent: Jun. 14, 2011

(54) SYSTEM AND METHOD FOR GENERATING SUBSTITUTABLE QUERIES

(75) Inventors: Rosie Jones, Pasadena, CA (US); Benjamin Rey, Saint Jorioz (FR); Tina Weyand, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 296 days.

(21) Appl. No.: 11/772,600

(22) Filed: Jul. 2, 2007

(65) Prior Publication Data

US 2008/0140699 A1 Jun. 12, 2008

Related U.S. Application Data

(63) Continuation of application No. 11/598,239, filed on Nov. 9, 2006, now abandoned.

(51) Int. Cl.
*G06F 17/30* (2006.01)

(52) U.S. Cl. .......... 707/728; 707/999.003; 707/999.006

(58) Field of Classification Search .................. 707/1–4, 707/6, 10, 100, 721, 713, 718, 728, 730, 707/999.003, 999.006
See application file for complete search history.

(56) References Cited

U.S. PATENT DOCUMENTS

| | | | |
|---|---|---|---|
| 6,985,904 B1 * | 1/2006 | Kaluskar et al. | 707/101 |
| 7,725,485 B1 * | 5/2010 | Sahami et al. | 707/767 |
| 2007/0011154 A1 * | 1/2007 | Musgrove et al. | 707/5 |
| 2010/0010895 A1 * | 1/2010 | Gabrilovich et al. | 707/4 |
| 2010/0161643 A1 * | 6/2010 | Gionis et al. | 707/765 |

* cited by examiner

*Primary Examiner* — Marc R Filipczyk
(74) *Attorney, Agent, or Firm* — Seth H. Ostrow; Ostrow Kaufman LLP (57) ABSTRACT

The present invention is directed towards systems and methods for generating one or more related queries with respect to a given query. The method may comprise receiving a query comprising one or more terms, generating a corpus of candidate reformulations and identifying one or more queries or terms from the corpus of candidate reformulations related to the received query. One or more related queries are generated on the basis of the identified one or more queries or terms from the corpus of candidate reformulations.

13 Claims, 5 Drawing Sheets

SYSTEM AND METHOD FOR GENERATING SUBSTITUTABLE QUERIES

The present application is a continuation application of pending U.S. patent application Ser. No. 11/598,239, entitled "SYSTEM AND METHOD FOR GENERATING SUBSTITUTABLE QUERIES", filed on Nov. 9, 2006 which claims the benefit of U.S. Provisional Patent Application No. 60/736,133, entitled "MODULAR OPTIMIZED DYNAMIC SETS," filed on Nov. 9, 2005, the disclosure of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED REFERENCES

The present application is related to the following commonly owned U.S. patents and patent applications:

U.S. patent application Ser. No. 11/295,166, entitled "SYSTEMS AND METHODS FOR MANAGING AND USING MULTIPLE CONCEPT NETWORKS FOR ASSISTED SEARCH PROCESSING," filed on Dec. 5, 2005;

U.S. patent application Ser. No. 10/797,586, entitled "VECTOR ANALYSIS OF HISTOGRAMS FOR UNITS OF A CONCEPT NETWORK IN SEARCH QUERY PROCESSING," filed on Mar. 9, 2004;

U.S. patent application Ser. No. 10/797,614, entitled "SYSTEMS AND METHODS FOR SEARCH PROCESSING USING SUPERUNITS," filed on Mar. 9, 2004; and U.S. Pat. No. 7,051,023, entitled "SYSTEMS AND METHODS FOR GENERATING CONCEPT UNITS FROM SEARCH QUERIES," filed on Nov. 12, 2003;

The disclosures of which are hereby incorporated by reference herein in their entirety.

BACKGROUND OF THE INVENTION

The World Wide Web may be though of as a distributed data store comprising billions of data content items through the Internet. Search engines are commonly used to search the content items available on computer networks, such as the World Wide Web, to enable users to locate content items of interest. A typical search engine is capable of accessing the plurality of web pages, hypertext documents, and other content items from the Internet or other network through use of a crawler. A crawler identifies content items available from a number of sources, using various methods and algorithms. For example, a crawler may follow hyperlinks in a corpus of hypertext documents to identify other content items. The content items that the crawler identifies, or references thereto, may be stored in a database or a similar data store. Thereafter, these content items are indexed by an indexer, which may be operative to build a searchable index of the content items n the database. Existing methods for indexing may include inverted files, vector spaces, suffix structures, and hybrids thereof. For example, each web page may be broken down into words and respective locations of each word on the page. The pages are then indexed by the words and their respective locations. A primary index of the whole database may then be broken down into a plurality of sub-indices, with a given sub-index being sent to a search node in a search node cluster.

To use search engine, a user typically enters one or more search terms or keywords, which are sent to a dispatcher. A dispatcher may compile a list of search nodes in a cluster to execute the query and may forward the query to those selected search nodes. The search nodes in a search node cluster may search respective parts of the primary index produced by the abovementioned indexer and return sorted search results, along with an identifier and a score, to the dispatcher. The dispatcher may then merge the received results to produce a final result set for display to the user, sorted by relevance scores.

The relevance score may be a function of the query itself and the type of document produced. Factors that affect the relevance score may include: a static relevance score for the document such as link cardinality and page quality, placement of the search terms in the document, such as titles, metadata, and document web address, document rank, such as a number of external data records referring to the document and the "level" of the data records, and document statistics such as query term frequency in the document, global term frequency, and term distances within the document. For example, Term Frequency Inverse Document Frequency ("TF/IDF") is a statistical technique that is suitable for evaluating how important a word is to a document. According to TF/IDF, the importance of a given word increases proportionally to the number of times the given word appears in the document, but is offset by how common the word is across documents in the collection.

In addition to search results identified as response to the one or more terms received from a given user, a user may also be presented with one or more advertisements. For example, an advertiser may agree to pay an amount of money to a search engine operator, commonly referred to as the bid amount, in exchange for a particular position in a set of search results that is generated in response to a user's input of a particular search term. A higher bid amount may result in a more prominent placement of the advertiser's website in a set of sponsored search results. Advertisers may adjust their bids or bid amounts to control the position at which their search listings are presented in the sponsored search results. The charging system places search listings having higher-value bids higher or closer to the top of the search listings. More prominent listings are seen by more users and are more likely to be clicked through, producing traffic of potential customers to the advertiser's web site.

Search engine operators have developed various tools suitable for use in pay-for-placement systems to help advertisers manage their bids and attract traffic. For example, a bidding tool may be used to select keywords upon which advertisers may bid to have their advertisements or websites displayed in response to a search comprising one or more terms associated with the selected keywords. Thus, when a user performs a search on a pay-for-placement search engine, or when selecting one or more advertisements for display, the sponsored results are conventionally sorted and displayed on the basis of an amount that a given advertiser has bid on a given search term. Because different users use different keywords to find the same information, it is important for an advertiser to bid on a wide variety of search terms to maximize the traffic to the advertiser's website.

Advertisers may attempt to place high bids on more than one search term to increase the likelihood that their websites will be seen as a result of a search for those terms. The better and more extensive an advertiser's list of search terms, the more traffic the advertiser will see. There are many similar search terms, however, for which the advertiser many not have bid. As a result, the advertiser can miss opportunities for advertising placement when these similar search terms are used, and the search engine operator may not receive any revenue from searches performed using such search terms for which there have been no bids.

Even in the context of non-sponsored searches, or search results that do not involve pay-for-placement listings, a search engine user is at a disadvantage in the absence of intelligent searching of search terms that are similar to those that the user provides to the search engine. This produces limited results that do not necessary reflect user intent in conducting a search. In some systems, there is some spell-checking that is performed on search terms that a user provides to the search engine.

Thus, there is a need for systems and methods that provide searches or suggested searches of search terms that are similar or related in meaning to the search terms that a user provides to a search engine. There is also a need for a system and method for searching unbidded search terms in a sponsored search systems that are similar or related or related in meaning to those that a user provides.

SUMMARY OF THE INVENTION

In some embodiments, methods and systems are provided using Modular Optimized Dynamic Sets ("MODS"). MODS may be used to generate, from a first query, one or more related or suggested queries, such as search queries. In some embodiments, substitutables are used with MODS, but methods other than the use of substitutables may also be used with MODS.

Substitutables include mining stored or using stored data relating to previous user behavior. for example, to generate a related query, queries entered by a user proximate to the first query, can be used, such as queries entered just before or just after the first query. Substitutables, and other methods described herein, can be used with subsets or units of queries (such as terms or groups of terms of a given query), and related or suggested queries may be generated from combining related units, according to logic and algorithms described herein.

In some embodiments, MODS includes generating related or suggested queries, and choosing or ranking the related or suggested queries. In some embodiments, MODS uses methods other than substitutables in generating related queries, such as using Wordnet, Prisma, or document co-occurrence statistics to find related queries or units of queries (also referred to as segments).

Furthermore, substitutables can be used with MODS, but can have other uses as well. For example, substitutables can be used in generating related phrases in documents, in question answering such as by generating related questions or related answers, in decomposing phrases, indexing for web searching, retrieval algorithms for web searching, etc.

In some embodiments, MODS comprises methods or algorithms to rank related or suggested queries, such as ranking in accordance with closeness in meaning, or best match, to a first query. These methods may include whole queries, or the use and combination of query units. In some embodiments, ranking methods or algorithms utilize or incorporate the use of a number of factors or measures of such factors. These factors may include a preference for whole query changes or one or more unit changes. The factors may also include a preference for fewer unit changes. The factors may further include, in the context of a whole query or certain number of unit changes, ordering or ranking using a log likelihood ratio test or other generalized likelihood ratio test.

In some embodiments, MODS may be used in connection with an auction and bidding-based search query marketplace, in which, for example, advertisers may bid to have their advertisements served in response to a given query, or served in a particular rank or position of prominence in response to a query. Ranking methods or algorithms may use additional or other factors including bidding-related factors, such as which of a series of related or suggested queries has been bid on by an advertiser.

In some embodiments, ranking methods or algorithms may use a computer generated approximation or estimation of a human editorial rating of the relatedness of a query, or indication of preference between related or suggested queries. Such approximations may include the use of liner regression or other regression algorithms, use of random forests of decision trees, or the use of other machine learning algorithms, which may be used in generating an editorial score or rating. Furthermore, one or more functions or algorithms may be used to generate, based at least in part on the score or rating, a measure or score indicating the relevance of a query with a first query, such as providing a percentage chance of relevance.

Some or all of a variety of query features may be used as input to a human editorial approximation algorithmic model. Three such features include, but are not limited to, character edit distance, word edit distance and number of substitutables.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
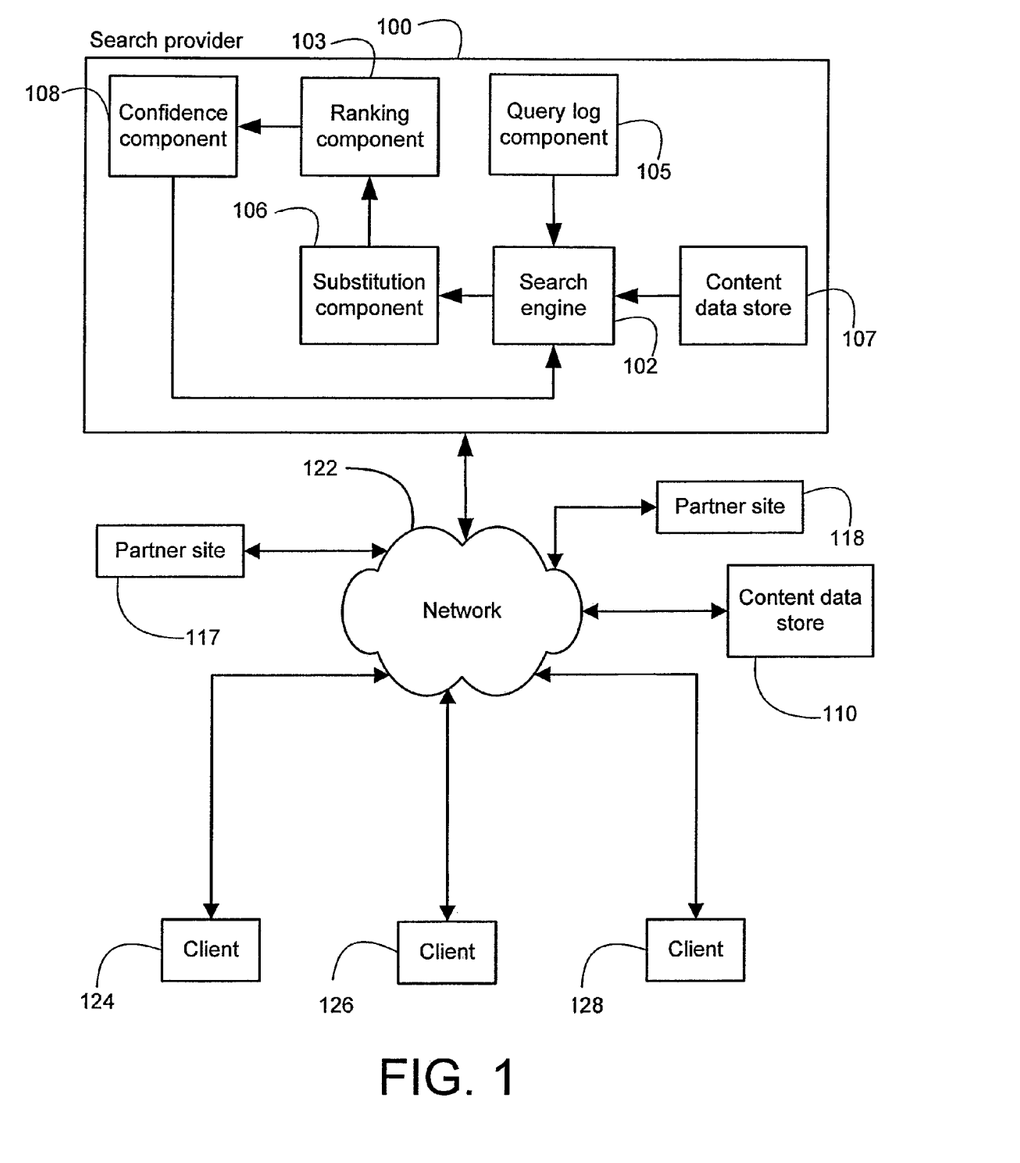
FIG. 1 is a block diagram illustrating one embodiment of a system for generating one or more query substitutions for a given query, according to one embodiment of the present invention.

FIG. 1 presents a block diagram depicting one embodiment of a system for identifying one or more query substitutables for a given query, wherein a query substitutable comprises a related query with respect to a given user query. According to the embodiment of FIG. 1, client devices 124, 126, and 128 are communicatively coupled to a network 122, which may include a connection to one or more local or wide area networks, such as the Internet. According to one embodiment, a client device 124, 126, and 128 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Users of client devices 124, 126, and 128 communicatively coupled to the network 122 may submit search queries, comprising one or more terms, to a search provider 100. A typical query received from a user of a client device 124, 126, and 128 has one or more terms. For example, the query "wireless notebook computer" contains three terms and may be referred to as a three-term query. Similarly, queries containing only one term are referred to as one-term queries, queries containing two terms are two-term queries, etc. A space or other delimiter character may be used to identify the individual terms comprising a given query.

A search engine 102 at the search provider 100 may utilize the one or more terms comprising a given query to identify content items, such as web pages, video clips, audio clips, documents, etc., that are responsive to the one or more terms comprising the query. According to one embodiment, the search engine 102 at the search provider 100 uses communication pathways that the network 122 provides to access one or more remote 107 or local 110 content data stores to locate content items that are responsive to a given query received from a user of a client device 124, 126, and 128. Local 107 and remote 110 content data stores may comprise accessible memory structures such as a database, CD-ROM, tape, digital storage library, etc., and may be implemented as databases, file systems, or any other type of storage structures capable of providing for the retrieval and storage of a variety of content.

The search provider 100 receives queries from a given user of a client device 124, 126, and 128 for delivery to a query log component 105. Alternatively, or in conjunction with the foregoing, the search provider 100 may monitor queries submitted to one or more partner sites 117 and 118 for submission to the query log component 105. For example, a partner site may 117 and 118 comprise a search engine or similar web page that may receive one or more queries from one or more users of client devices 124, 126, and 128. The search provider 100 may monitor the one or more queries submitted by users of client devices to one or more partner sites 117 and 118 and deliver the one or more queries to the query log component 105 at the search provider.

The query log component 105 is operative to store one or more queries received from one or more users of client devices 124, 126, and 128 by the search provider 100. The query log component 105 may be implemented as a database or other data store capable of providing for the storage of one or more queries. According to one embodiment of the invention, the query log component 105 is operative to store one or more queries with information indicating the source, such as the user, with which the query originated, the time at which the query was received from the respective source, etc.

The information maintained by the query log component 105 may be used to calculate the frequency with which one or more queries are submitted to the search provider 100. Similarly, the information maintained by the query log component 105 may be used to calculate the frequency with which a given query follows a related query. For example, during a given session, a user of a client device 124, 126, and 128 conducting a search may submit a query comprising the terms "intellectual property." During the same session, which may comprise a given duration of time, such as a single day, the user may submit a query comprising the terms "patent attorney." The information maintained by the query log component 105 may be used to calculate the frequency with which the query "patent attorney" follows the query "intellectual property" during a given user session.

The queries and corresponding information maintained by the query log component 105 may be used to identify one or more candidate reformulations, wherein a candidate reformulation comprises a pair of successive queries issued by a given user of a client device during a given time period, such as an hour or a day. For example, a user of a client device 124, 126, and 128 may deliver the query "cellular phones" to the search provider 100. Twenty minutes later, the user of the client device 124, 126, and 128 may deliver the query "wireless technology" to the search provider 100. The query "wireless technology" may be identified as a candidate reformulation with respect to the query "cellular phones."

The search engine 102 may deliver a request to the query log component 105 for one or more candidate reformulations generated from the one or more queries from users of client devices 124, 126, and 128. The query log component 105 may utilize the information associated with one or more queries maintained by the query log component 105, including the one or more users with which the queries originated and the time at which the queries were generated, to identify one or more candidate reformulations. For example, the query log component 105 may identify the one or more queries submitted by users of client devices 124, 126, and 128 immediately after submitting the query "notebook computers." Alternatively, or in conjunction with the foregoing, the query log component 105 may identify the one or more queries submitted by one or more users of client devices 124, 126, and 128 within a given duration of time after submitting the query "notebook computers," such as twenty four hours.

The one or more candidate reformulations identified by the query log component 105 may be delivered to the search engine 102, which may forward the one or more candidate reformulations to a substitution component 106. The substitution component 106 is operative to identify the extent to which the pair of queries comprising a given candidate reformulation are related. According to one embodiment of the invention, the substitution component 106 utilizes a log-likelihood ratio analysis to generate a score for a given candidate reformulation indicating the extent to which the pair of queries comprising the candidate reformulation are related. Additionally, a log likelihood ratio score threshold may be used to identify the one or more candidate reformulations that are the most related. For example, the one or more candidate reformulations with log likelihood ratio scores that do not meet or exceed a log likelihood ratio score threshold may be removed from the one or more candidate reformulations.

The substitution component 106 is further operative to generate a candidate set of one or more query substitutables through use of the candidate reformulations identified by the query log component 105. According to one embodiment of the invention, the substitution component identifies one or more whole query substitutions associated with a query received from a user of the client device 124, 126, and 128. For example, a query received from a given user of a client device 124, 126, and 128 may comprise the terms "wireless notebook cards." The candidate reformulations identified by the query log component may indicate that the query "802.11 computer device" is the query that successively appears with the greatest frequency with respect to the query "wireless notebook cards." Accordingly, the query "802.11 computer device" may be identified as a whole query substitution for the query "wireless notebook cards."

The substitution component 105 may further identify one or more segment substitutions for a query received from a user of a client device 124, 126, and 128 through use of the candidate reformulations generated by the query log component 105. According to one embodiment of the invention, the substitution component 105 is operative to utilize a segment or units data store (not illustrated) to identify one or more segments comprising the query received from a user of a client device 124, 126, and 128. For example, the query received from a user of a client device 124, 126, and 128 may comprise the terms "Britney Spears MP3s." With reference to a segment or units data store, the substitution component 106 may identify the query as comprising the segments "(Britney Spears)" and "(MP3s)". The one or more segments maintained in the segment or unit data store may comprise one or more terms or phrases that commonly appear in search queries, or one or more terms or phrases that commonly appear in web pages, documents, etc., or one or more common terms or phrases as identified by a human editor.

According to another embodiment of the invention, the one or more terms comprising a query that do not appear in the abovementioned segment or units data store are identified as individual segments. For example, a given query may be received from a user of a client device 124, 126, and 128 that may comprise the terms "keyboard layout qwerty." The substitution component 106 may determine that the term "qwerty" does not appear in the segment or units data store, and accordingly, may identify the term "qwerty" as an individual segment.

The substitution component 105 may thereafter identify the one or more ways in which the one or more segments of the query received from a user of a client device 124, 126, and 128 have been reformulated or modified, as indicated by the candidate reformulations identified by the query log component 105. For example, the substitution component 105 may identify that the query "Britney Spears MP3s" received from a user of a client device 124, 126, and 128 comprises the segments "(Britney Spears)" and "(MP3s)". The substitution component 105 may thereafter identify the one or more candidate reformulations associated with the segment "(Britney Spears)," such as "Britney," or "singer." Similarly, the substitution component 105 may identify the one or more candidate reformulations associated with the segment "(MP3s)," such as "songs" or "music."

The substitution component 105 may replace the one or more segments of the query received from a user of a client device 124, 126, and 128 with the one or more candidate reformulation segments identified as related to a given segment of the user query in order to generate one or more segment substitutable queries. With reference to the abovementioned example, the segment "(MP3s)" may be replaced with the segment "(songs)," generating the segment substitutable query "Britney Spears songs." Similarly, the segment "(Britney Spears)" may be replaced with the segment "(Britney)," generating the segment substitutable query "Britney MP3s."

The substitution component 105 may also identify one or more queries with the same number of segments as the query received from a user of a client device 124, 126, and 128. From among the one or more queries identified as having the same number of segments as the query received, the substitution component 105 may select the one or more queries with a single segment that is different from the one or more segments of the query received from the user of the client device 124, 126, and 128. The one or more segments are identified as candidate segment-level reformulations, which may then be used to replace segments of the received user query to form one or more candidate reformulations. For example, a query received from a user of a client device 124, 126, and 128 may comprise the segments "(Caribbean)(beach)(vacations)." Assume a subsequent query with the same number of segments and only a single segment that differs from the received user query comprise the segments "(Caribbean)(cruise) (vacations)." Accordingly, the segment "(beach)" may be considered a candidate reformulation or segment substitutable for the segment "(cruise)". Changes may be limited to a single unit in some embodiments to ensure high quality phrase substitutables. When forming a query candidate reformulation by breaking an input query into phrases, one, several or all of the segments may be substituted by referring to the table of previously calculated segment substitutables. According to one embodiment of the invention, query candidate reformulation may be performed as an off-line process, The candidate set of query substitutables, comprising both whole query substitutables and segment substitutables, is delivered to a ranking component 103. The ranking component 103 is operative to assess the substitution quality and generate a ranking of the one or more query substitutables in the candidate set. According to one embodiment of the invention, the one or more query substitutables in the candidate set are ranked according to the log likelihood ratio score with which the one or more query substitutables are associated. According to another embodiment of the invention, the one or more query substitutables are ranked according to query substitutable type. For example, the one or more queries comprising whole query substitutables may be ranked above the one or more queries comprising segment substitutables. According to yet another embodiment of the invention, the one or more query substitutables are ranked according to a combination of log likelihood ratio score and query substitutables type. According to a further embodiment of the invention, the one or more query substitutables are ranked according to a score generated through use of a linear regression analysis.

The one or more query substitutables comprising the candidate set, ranked according to methods described herein, are delivered to a confidence component 108. The confidence component 108 is operative to calculate the probability that a given query substitutable is related to a given query received from a user of a client device 124, 126, and 128. According to one embodiment of the invention, a probability score is generated for the one or more query substitutables in the candidate set identifying the probability that that the one or more query substitutables match or are similar to a query received from a user of a client device 124, 126, and 128. The one or more query substitutables in the candidate set with probability scores that do not meet or exceed a given threshold may be removed from the candidate set.

The one or more query substitutables in the candidate set may thereafter be delivered to the search engine 102. The search engine may utilize the one or more query substitutables to locate content items that are responsive to a query received from a user of a client device 124, 126, and 128, including, but not limited to, web pages, documents, audio files, video files, images and advertisements. For example, a given query received from a user of a client device 124, 126, and 128 may comprise the terms "caffeinated beverages." The query received by the user may result in few if any responsive web pages, documents, advertisements, etc. The search provider 100, however, may identify one or more query substitutables, such as "coffee," "Coke," etc. The search engine 102 at the search provider 100 may utilize the identified query substitutables to perform a search of remote 110 and local 107 content data stores to identify content items that are responsive to the identified query substitutables. For example, the search engine 102 may search for web pages or advertisements responsive to the query substitutables "coffee" and "Coke." The content items that the search provider 100 identifies as being responsive to the query substitutables may be delivered to the user of the client device 124, 126, and 128 from which the query "caffeinated beverages" originated.

Figure 2:
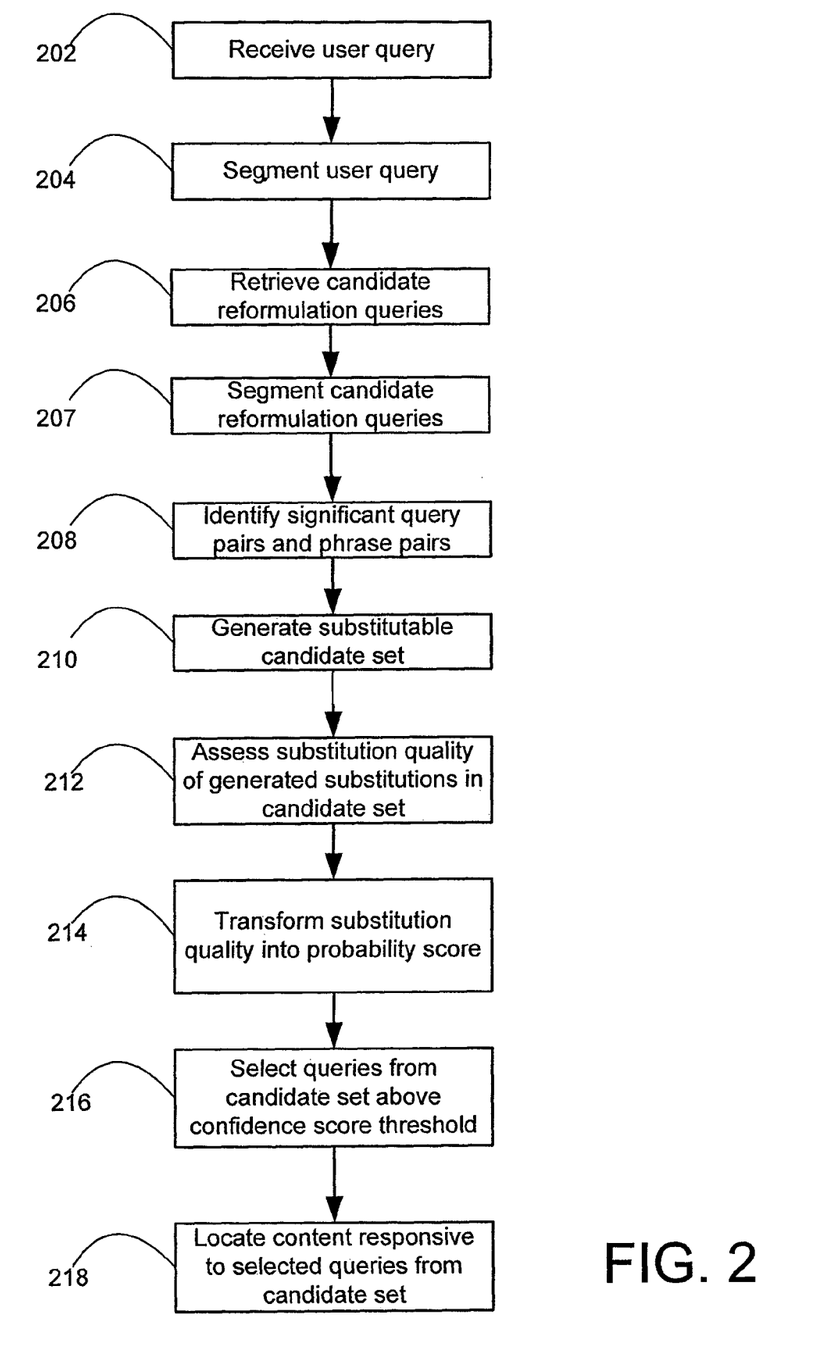
FIG. 2 is a flow diagram illustrating one embodiment of a method for generating one or more query substitutions for a given query, according to one embodiment of the present invention.

FIG. 2 is a flow diagram illustrating one embodiment of a method for generating one or more query substitutables for a given query from a user. According to the embodiment illustrated in FIG. 2, a query is received from a given user, step 202. The query received from the user is segmented into one or more segments, wherein a segment comprises one or more terms, step 204. The one or more segments comprising the query received may be identified through use of a units or segments data store, operative to maintain one or more terms that frequently appear in queries. For example, a units or segments data store may maintain terms that frequently appear in queries. Similarly, a units or segments data store may maintain common terms, as specified by a human editor, or that frequently appear in web pages, documents, advertisements, etc.

The one or more segments into which the query received from a given user is segmented may comprise one or more terms or phrases. Table A illustrates one embodiment of a query, and the segments into which the query may be segmented:

TABLE A

| Query: | discount mazda mx6 body parts |
|---|---|
| Segmented query: | (discount) (mazda mx6) (body parts) |

According to the embodiment illustrated in Table A, the query "discount mazda mx6 body parts" is segmented into the segments "(discount)", "(mazda mx6)," and "(body parts)." As previously described, the segments into which the query is segmented may be based upon the frequency with which the one or more terms or phrases in each segment appear in one or more queries. Similarly, the one or more terms in each segment may be based upon an analysis of common terms or phrases specified by a human editor. Segmenting of user queries is described in greater detail in the applications incorporated herein by reference.

One or more candidate reformulations are retrieved, step 206. According to one embodiment of the invention, a candidate reformulation comprises a pair of successive queries issued by a given user during a given time period. For example, one or more successive query pairs generated by users of client devices may be maintained in a database or similar structure. The queries maintained in one or more query logs may be stored with an indication of the user with which the queries were generated, as well as the time at which the queries were generated. The user and time information associated with the one or more queries may be used to identify one or more candidate reformulations. For example, a candidate reformulation may comprise a pair of queries issued immediately after each other. Similarly, a candidate reformulation may comprise a pair of queries issued within one hour or five minutes of each other.

The one or more candidate reformulation queries are segmented into one or more segments in order to identify the one or more segments comprising the one or more candidate reformulation queries that are related, step 207. For example, a given candidate reformulation query pair may comprise the queries "Britney Spears MP3s" and "Britney Spears Lyrics," which may be segmented into "(Britney Spears) (MP3s)" and "(Britney Spears)(Lyrics)," respectively. The segments "(MP3s)" and "(Lyrics)" may be identified as a related segment, as both segments appear in queries in which the segment "(Britney Spears)" is present. Similarly, the whole queries "Britney Spears MP3s" and "Britney Spears Lyrics" may be identified as related, as both queries contain the segment "(Britney Spears)."

An analysis is performed upon the one or more candidate reformulations and the one or more segments comprising the candidate reformulation queries in order to identify the extent to which the pair of queries comprising a given candidate reformulation, and the one or more segments comprising a given candidate reformulation, are related, step 208. According to one embodiment of the invention, a pair independence hypothesis likelihood ratio is used to identify the extent to which a given pair of queries of a candidate reformulation, or the one or more segments differing in the pair of queries, are related. A pair independence hypothesis likelihood ratio may be used to test the statistical hypothesis that a given query appears in a session with another query with a probability higher than chance, or that a given segment replaces a segment in another query differing by only one segment, with a probability higher than chance. Table B illustrates one embodiment of a pair independence hypothesis likelihood ratio that may be used to determine the extent to which a pair of queries, or segments contained in a pair of queries, are related.

TABLE B $$H_1 : P(q_2|q_1) = p = P(q_2|\neg q_1)$$
$$H_2 : P(q_2|q_1) = p_1 \neq p_2 = P(q_2|\neg q_1)$$
$$LLR = -2 \log \lambda = -2 \log \frac{L(H_1)}{L(H_2)}$$

In the equation illustrated in Table B, $\lambda$ is a likelihood ratio value indicating the degree to which $q_2$ and $q_1$ are related. According to one embodiment, a high value for the likelihood ratio $\lambda$ suggests $q_2$ and $q_1$ are closely related. Table C illustrates one embodiment of the equations that may be used to calculate the log likelihood values for $H_1$ and $H_2$ through use of the function L illustrated in Table B.

TABLE C $$p = \frac{c2}{N}$$

$$p1 = \frac{c12}{c1}$$

$$p2 = \frac{c2 - c12}{N - c1}$$

TABLE C-continued $$b(k; n, x) = \binom{n}{k} x^k (1-x)^{(n-k)}$$

$$\log \lambda = \log \frac{L(H1)}{L(H2)}$$

$$= \log \frac{b(c_{12}, c_1, p)b(c_2 - c_{12}, N - c_1, p)}{b(c_{12}c_1, p_1)b(c_2 - c_{12}, N - c_1, p_2)}$$

$$= \log L(c_{12},c_1,p) + \log L(c_2-c_{12},N-c_1,p) - \log L(c_{12},c_1,p_1) - \log L(c_2-c_{12},N-c_1,p_2)$$
where $L(k,n,x) = x^k (1-x)^{(n-k)}$ In the equations illustrated in Table C, the likelihood of getting the counts for $q_1$, $q_2$ is $L(H1)=b(c_{12}; c_1,p)b(c_2-c_{12}; N-c_1,p)$ for H1 and $L(H2)=b(c_{12}; c_1, p_1)b(c_2-c_{12}; N-c_1,p_2)$ for H2. $p$, $p_1$ and $p_2$ comprise the maximum likelihood estimates. $c_1$, $c_2$, and $c_{12}$ comprise the number of occurrences of $q_1$, $q_2$ in a corpus. Table D illustrates exemplary segments and queries with corresponding likelihood ratios, $\lambda$, indicating the degree to which one or more segments or queries are related to a given term.

TABLE D

| Candidate reformulation | Likelihood ratio |
|---|---|
| dog → dogs | 9185 |
| dog → cat | 5942 |
| dog → dog breeds | 5567 |
| dog → dog pictures | 5292 |
| dog → 80 | 2420 |
| dog → pets | 1719 |
| dog → puppy | 1553 |
| dog → dog picture | 1416 |
| dog → animals | 1363 |
| dog → pet | 920 |

A query substitutable candidate set of one or more query substitutables is thereafter generated for the original query received from the user, step 210. The one or more segments of the original user query, identified at step 204, may be used in conjunction with the one or more candidate reformulation queries and segments to identify one or more query substitutables for the original user query. According to one embodiment of the invention, the one or more queries and one or more query segments associated with the original query received from the user in step 202, as indicated by the candidate reformulations, are identified. For example, the one or more whole query substitutables for the original query received from the user may be identified, wherein a whole query substitutable may comprise a whole query identified as a candidate reformulation with respective to a given query.

Alternatively, or in conjunction with the foregoing, the one or more queries and segments associated with the one or more segments of the query received from the user in step 202 are identified through use of the candidate reformulations. For example, the one or more candidate reformulation segments and queries associated with a given segment of the query received from the user in step 202 may be identified, comprising the one or more segment substitutables for the received user query. The one or more segments or queries associated with a given segment of the query received from the user may be substituted for the given segment to generate a segment query substitutable for the received user query.

The substitution quality of the one or more queries in the query substitutables candidate set is thereafter assessed and used to generate a ranking of the one or more query substitutables, step 212. According to one embodiment, the substitution quality associated with the one or more query substitutables in the candidate set comprises the log likelihood ratio score associated with the one or more query substitutables. According to another embodiment of the invention, the substitution quality associated with the one or more query substitutables comprises a score generated through use of linear regression analysis upon one or more features associated with the one or more query substitutables, according to methods described herein.

A probability model is thereafter used to transform the substitution quality score associated with the one or more query substitutables into a probability score, step 214. A transformation of the substitution quality score associated with a given query substitutable provides an indication of the probability that the query substitutable matches or is similar in meaning with respect to the original user query. According to one embodiment of the invention, an isotonic regression is used to transform the substitution quality score associated with one or more query substitutables into a probability score. According to another embodiment of the invention, a sigmoid function is used to transform the substitution quality score associated with the one or more query substitutables in the candidate set into a probability score by using labeled training data.

The one or more query substitutables with a probability score exceeding a given threshold are thereafter selected, step 216. The one or more selected query substitutables may be used to locate content items including, but not limited to, web pages, documents, audio files, or video files responsive to the original user query, step 218. Additionally, the one or more selected query substitutables may be used to identify advertisements to be displayed to the user from which the user query originated.

Those of skill in the art recognize the method illustrated in FIG. 2 need not be performed in the order specified and is not limited to the embodiment illustrated in FIG. 2. Those of skill in the art further recognize that one or more of the steps illustrated in FIG. 2 and the data utilized for processing queries may be performed prior to execution of the method illustrated in FIG. 2. For example, the retrieval and processing of candidate reformulation queries may be performed prior to the receipt of a user query.

Figure 3:
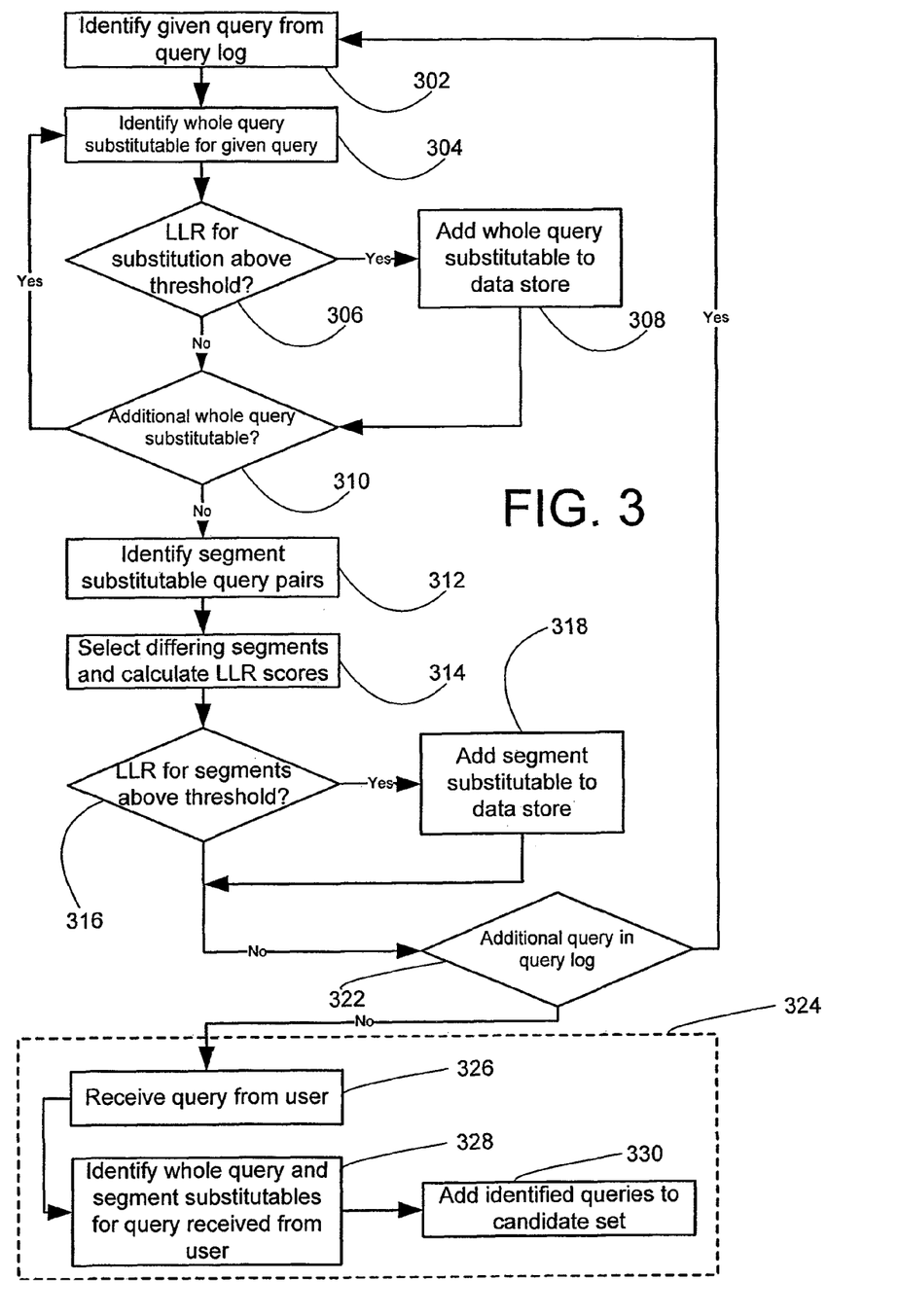
FIG. 3 is a flow diagram illustrating one embodiment of a method for selecting one or more query substitutions from among one or more candidate queries according to one embodiment of the present invention.

FIG. 3 illustrates one embodiment of a method for generating a candidate set of one or more whole query and segment substitutables for a given user query. According to the embodiment illustrated in FIG. 3, a given query is selected from one or more query logs that comprise a plurality of queries over which users have conducted searches, step 302. A whole query substitutable is also identified from the one or more query logs, step 304, which according to one embodiment comprises a successive query issued by one or more users during a given time period subsequent to the issuance of the given query. A check is performed to determine if a log likelihood ratio (described above) for the whole query substitutable exceeds a threshold, step 306. Where the likelihood ratio of the whole query substitutable exceeds the threshold, the whole query substitutable is added to a substitutable data store, step 308. According to one embodiment, a given query substitutable added to the substitutable data store is annotated with information identifying the query substitutable as whole query substitutable.

A check is performed to determine if there are additional whole query substitutables in the one or more query logs for the given query, step 310. Where additional whole query substitutables are present, processing returns to step 304 with the identification of a subsequent whole query substitutable for the given query. If the check at step 310 evaluates to false, the method may identify segment substitutable query pairs from the one or more query logs, step 312. As previously described, the one or more segments into which a user query may be segmented comprise one or more terms or phrases. According to one embodiment, a segment substitutable query pair is a query that differs from the given query by one segment, which may comprise all query pairs in the query log, although queries that differ from the given query by more than one segment may be utilized.

The segment substitutable query pairs are identified, step 312, and the differing segments are selected from the segment substitutable query pairs, step 314, which may be selected from the set of co-occurring segment substitutable query pairs in the query logs. For example, where the given query comprises the terms "(Britney Spears)(MP3)" and the segment substitutable query comprises the terms "(Britney Spears)(songs)", the segments (MP3) and (songs) are selected as the differing segments. Using pairs of queries which differ by one segment, the probability of the segment (mp3s) being replaced by the segment (songs) may be calculated, the probability of the segment (mp3s) being replaced by any other segment may be calculated, and the probability of an arbitrary segment being replaced by (songs) may be calculated. Likelihood ratios are calculated for the differing segments and a check is performed to determine if the likelihood ratios for the differing segments exceed a threshold, step 316, which may be the same threshold as used in step 306 or a disparate threshold. Where the likelihood ratios of the segments exceed the threshold, step 316, the segments are added to the substitutable data store, step 318.

When all whole query substitutables and segment substitutables are processed for a given query, a check is performed to determine if there are additional queries in the one or more query logs for processing, step 322. Where additional queries for processing are present in the query log, a subsequent given query is identified from the query logs for processing, step 302, and the process repeats. Where the check at step 322 evaluates to false, processing completes and is used by an "on line" portion 324 of the present method in which user queries are processed to identify candidate sets of substitutables.

According to the on line portion of the process 324, the system receives a query from the user, step 326, e.g., a search engine implementing embodiments of the present invention receives a search query comprising one or more terms from a user. On the basis of the user query, whole query substitutables and query substitutables are identified, step 328. For example, assume that the user provides the query "Britney Spears MP3s." With reference to the query substitutable data store, whole query substitutions are identified for the user query. Additionally, the user query is segmented into segments (Britney Spears) and (MP3s). Segments are identified that are substitutables for the segments of the user query. The identified whole query substitutables and segments substitutables are added to a candidate set of substitutables for the user query, step 330

Table E illustrates one embodiment of the one or more whole query substitutables and segment substitutables that may be generated for a given user query through use of the segments comprising the user query and one or more candidate reformulation queries and segments:

TABLE E

In the embodiment illustrated in Table E, the whole query substitutables "catholic names" and "baby names" are identified as whole query substitutables for the user query "catholic baby names." In order to identify segment substitutables, the user query "catholic baby names" is segmented into the segments "(catholic)(baby names)." The segment "(Christian)" is identified as a candidate reformulation for the segment "(catholic)," and is combined with the segment "(baby names)" to generate the query substitutable "Christian baby names." Similarly, the segment "(religious)" is identified as a candidate reformulation for the segment "(catholic)," and is combined with the segment "(baby names)" to generate the query substitutable "religious baby names."

Figure 4:
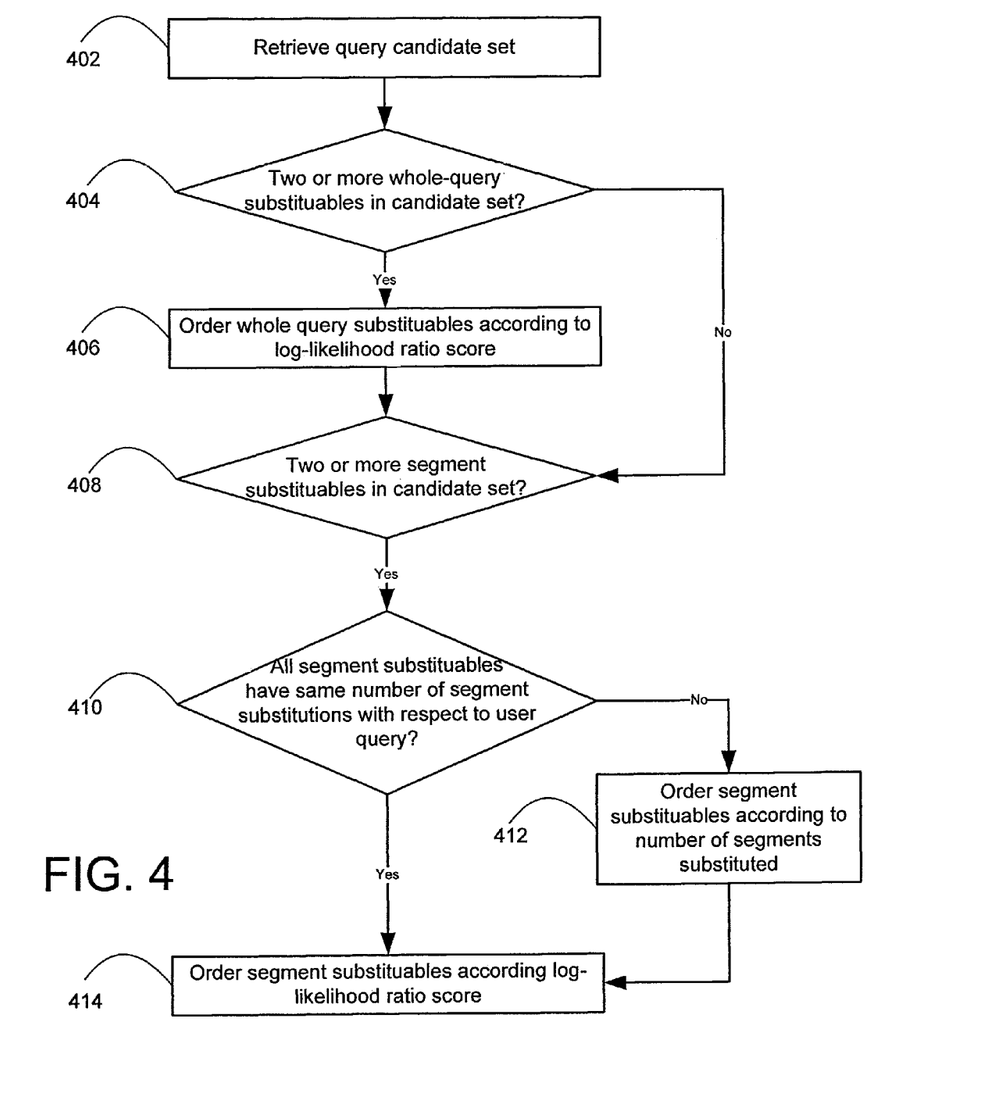
FIG. 4 is a flow diagram illustrating one embodiment of a method for ranking one or more query substitutions in a candidate set of query substitutables according to one embodiment of the present invention.

FIG. 4 illustrates one embodiment of a method for utilizing the substitution quality of the one or more query substitutables comprising the query substitutable candidate set for ranking the one or more query substitutables. According to the embodiment illustrated in FIG. 4, a candidate set of query substitutables is retrieved, step 402. A check is performed to determine whether the candidate set of query substitutables includes two or more whole query substitutables, step 404. As previously described, the one or more queries in the candidate set of query substitutables may comprise one or more whole query substitutables and one or more segment substitutables. The one or more substitutables in the candidate set may be annotated with information identifying the type of the one or more query substitutables.

If the candidate set of query substitutables includes one or more whole-query substitutables, the one or more whole query substitutables may be ordered according to log likelihood ratio score, step 406. As previously described, a log likelihood ratio score is calculated for the one or more query substitutables in the candidate set of query substitutables. The log likelihood ratio score provides an indication of the degree to which a given query substitutable is related to a given user query.

If the candidate set does not include two or more whole-query substitutables, or after the one or more whole-query substitutables have been ordered according to log-likelihood ratio score, a check is performed to determine whether the candidate set includes two or more segment substitutables, step 408. If the candidate set includes two or more segment substitutables, a check is performed to determine whether the two or more segment substitutables comprise the same number of substituted segments with respect to the user query, step 410. If the two or segment substitutables do not contain the same number of substituted segments with respect to the user query, the segment substitutables are ordered according to the number of segments substituted with respect to the user query. For example, a given user query may comprise the segments "(best)(restaurants)(New York city)." A first segment substitutable in the candidate set may comprise the segments "(best)(restaurants)(Manhattan)" with only one segment substituted (e.g., "(Manhattan)" for "(New York city)"). A second segment substitutable in the candidate set may comprise the segments "(best)(food)(Manhattan)" with two substituted segments (e.g., "(food)" for "(restaurants)," and "(Manhattan)" for "(New York city)"). Accordingly, the first segment substitutable may be ranked above the second segment substitutable, as the first segment substitutable contains fewer substituted segments than the second segment substitutable.

After the one or more segment substitutables have been ordered according to the number of substituted segments, or after it is determined that all of the segment substitutables contain the same number of substituted segments, the segment substitutables are ordered according to summary log likelihood ratio score. According to one embodiment of the invention, a summary log likelihood ratio score associated with a given segment substitutable comprises the minimum log likelihood ratio score of the one or more segments comprising the segment substitutable. For example, a given segment substitutable for the user query "desktop computers" may comprise the segments "(laptop)(computer)" The log likelihood ratio score associated with the segment "(laptop)" may comprise the value 2,319, whereas the log likelihood ratio score associated with the segment "(computer)" may comprise the value 4,888. Accordingly, the summary log likelihood ratio score associated with the segment substitutable is the value 2,319, comprising the minimum log likelihood ratio score of the one or more segments comprising the segment substitutable.

While the embodiment illustrated in FIG. 4 utilizes query substitutable type and log-likelihood ratio scores in order to assess and rank the one or more query substitutables in the candidate set of query substitutables, other techniques for assessing the substitution quality and for ranking the one or more query substitutables of a candidate set may be utilized. According to one embodiment of the invention, a machine learning model is used to determine the substitution quality of the one or more queries in the query substitutable candidate set. For example, a human editor may review the one or more query substitutables in the candidate set and annotate the one or more query substitutables with a score indicating the relative quality of the one or more query substitutables.

The one or more query substitutables, and the corresponding scores provided by the human editor, may be used by a machine learning model to learn techniques for determining the substitution quality and assigning substitution quality scores to one or more query substitutables. The scores associated with the one or more query substitutables generated by a machine learning model may thereafter be used to generate a ranking of the query substitutables in the candidate set.

Alternatively, or in conjunction with the foregoing, a linear regression analysis of one or more features associated with the original query received from the user and the one or more query substitutables may be used to assess the substitution quality of the one or more query substitutables in the candidate set. For example, a feature associated with the original user query and a query substitutable may comprise the word distance between the queries, wherein the word distance comprises the number of segments or terms in common between the original user query and the query substitutable. Similarly, a feature associated with the original user query and a query substitutable may comprise the normalized edit distance, wherein the normalized edit distance comprises the one or more letters of the one or more segments in common between the original user query and the query substitutable.

Table G illustrates the plurality of features that may be used to assess the substitution quality of a query substitutable with respect to an original user query:

TABLE G

| FEATURE | DESCRIPTION |
| --- | --- |
| length | numbers of characters $_{(q1)}$ |
| nLetters | number of letters (a-zA-z) in $_{q1}$ |
| nTokens | number of words in $_{q1}$ |
| tok1 | number of words only in $_{q1}$ |
| tok2 | number of words only in $_{q2}$ |
| nPhrases1 | number of phrases in $_{q1}$ |
| nPhrases2 | Number of phrases in $_{q2}$ |
| SponsoredResults | $_{q1}$ has a sponsored result |
| numSubst | number of phrases substituted |
| tok12 | number of words in common |
| Word edit-dist | proportion of words changed |
| nPhrasesDiff | nPhrases1! = nPhrases2 |
| distr | normalized edit distance |
| Dist | edit distance |
| possibleStem | is $_{q2}$ a stem of $_{q1}$ |
| prefixOverlap | num. prefix characters overlapping |
| LLR1min | $\min(LLR_{(P_i \to P_j)})$ |
| LLR2min | $\min(LLR_{(P_j \to P_i)})$ |
| fre$_{q1}$min | $\min(freq_{(P_i \to P_j)})$ |
| fre$_{q2}$min | $\min(freq_{(P_j \to P_i)})$ |
| fldivf2min | (freq1min + 0.5)/(freq2min + 0.5) |
| Dp1min | smallest deletion probability in $_{q1}$ |
| dp2min | Smallest deletion probability in $_{q2}$ |
| prP2givenP1min | $\min(p_{(P_i \to P_j)})$ |
| prP1givenP2min | $\min(p_{(P_j \to P_i)})$ |
| mutInfmn | $\min(MI_{(P_i, P_j)})$ |
| LLR1max | $\max(LLR_{(P_i, P_j)})$ |
| LLR2max | $\max(LLR_{(P_j, P_i)})$ |
| fre$_{q1}$max | $\max(freq_{(P_i \to P_j)})$ |
| fre$_{q2}$max | $\max(freq_{(P_j \to P_i)})$ |
| fldivf2max | (fre$_{q1}$max + 0.5)/(fre$_{q2}$max + 0.5) |
| dp1max | max deletion probability in $_{q1}$ |
| dpl2max | max deletion probability in $_{q2}$ |
| pu2givenu1max | $\max(p_{(P_i \to P_j)})$ |
| pu1givenu2max | $\max(p_{(P_j \to P_i)})$ |
| mutInfmax | $\max(MI_{(P_i, P_j)})$ |

One or more features from the features illustrated in Table G may be selected and used to generate a function for calculating a score indicating the substitution quality of a given query substitutable with respect to the original user query. The score generated by the function may be used for ranking the one or more query substitutables in the query substitutable candidate set. For example, the editDist, wordDist, and numSubst features may be selected and used by a function for generating a score indicating the substitution quality of a given query substitutable with respect to the original user query.

Table H illustrates one embodiment of a function that may be used to generate a score indicating the substitution quality of a given query substitutable with respect to an original user query:

TABLE H f(q1, q2) = .74 + 1.88 editDist(q1, q2) + 0.71 wordDist(q1, q2) + 0.36 numSubst(q1, q2)

In the equation illustrated in Table H, editDist($q_1$, $q_2$) comprises the normalized edit distance between the original user query $q_1$, and the query substitutable q2, wherein the edit distance comprises the Levenshtein distance between the original user query $q_1$, and the query substitutable q2. According to one embodiment of the present invention, the Levenshtein distance between queries $q_1$ and $q_2$ comprises the number of characters that must be inserted, substituted, or deleted from the query substitutable q2 in order to form the original user query $q_1$, divided by the number of characters in the query $q_1$ or $q_2$ with the greater number of characters. wordDist($q_1$, $q_2$) is the word distance between the original query $q_1$ and the query substitutable $q_2$, wherein the word distance comprises the number of unique terms in common between $q_1$ and $q_2$ divided by the total number of unique terms in $q_1$ and $q_2$. NumSubst($q_1$, $q_2$) comprises the number of segments substituted in query substitutable $q_2$ with respect to the original user query $q_1$, or zero where the candidate reformulation was formed using a whole-query substitution.

Figure 5:
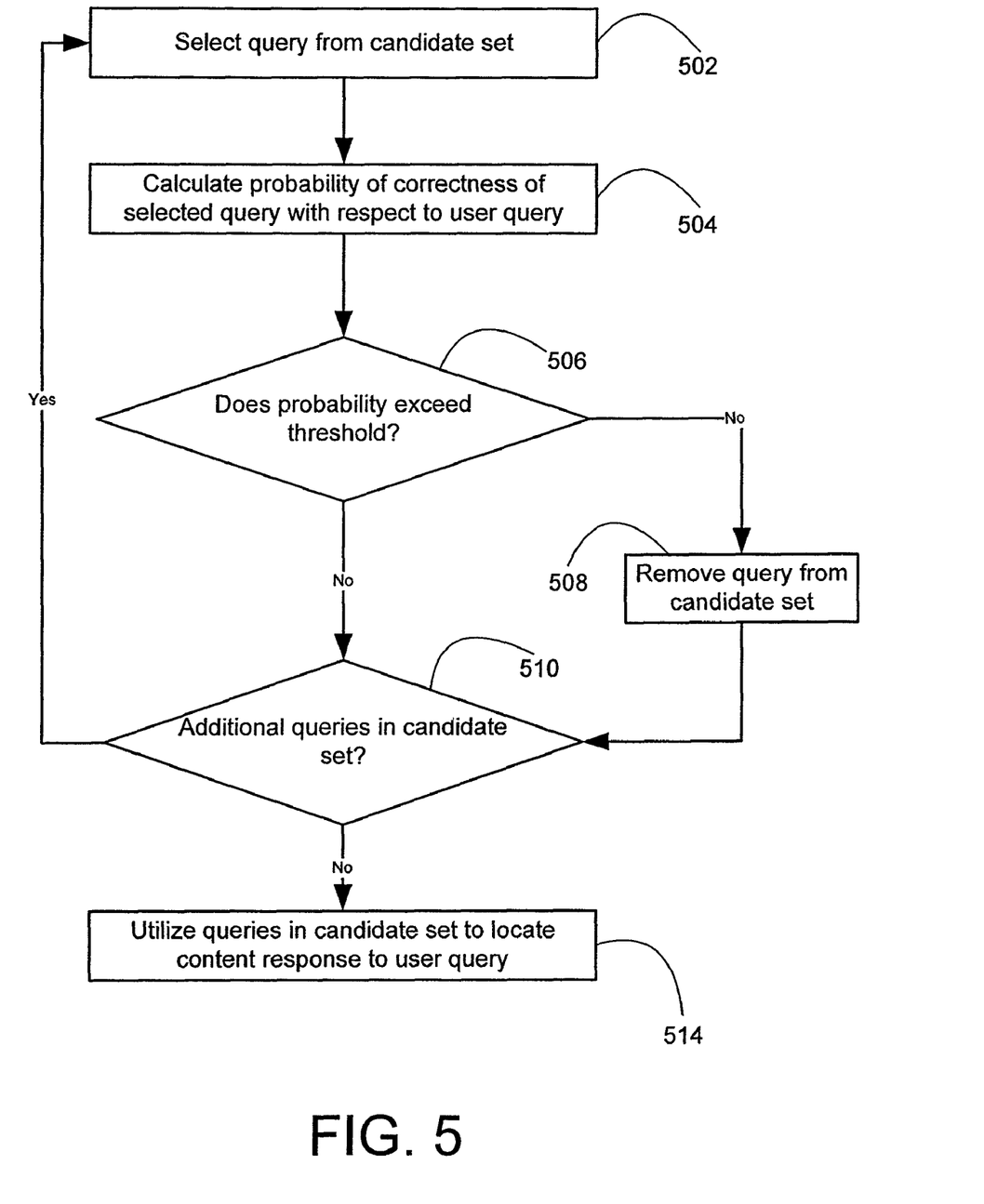
FIG. 5 is a flow diagram illustrating one embodiment of a method for selecting one or more query substitutions from a candidate set of query substitutions through use of a probability threshold according to one embodiment of the present invention.

FIG. 5 illustrates one embodiment of a method for selecting one or more query substitutables from the candidate set of query substitutables. According to the embodiment illustrated in FIG. 5, a given query substitutable is selected from among the one or more query substitutables in the query substitutable candidate set, step 502. A probability model is used to transform the value indicating the substitution quality associated with the selected query substitutable, step 504. As previously described, the substitution quality associated with a given query substitutable may comprise the log likelihood ratio score associated with the query substitutable. Alternatively, the substitution quality associated with a given query substitutable may comprise a score generated through use of a linear regression analysis.

According to one embodiment of the invention, a sigmoid function is used to transform the value indicating the substitution quality of a given query substitutable into a probability indicating the likelihood that a given query substitutable matches or is similar in meaning with respect to a given user query. Table I illustrates one embodiment of a sigmoid function that may be used to transform a value indicating the substitution quality of a given query substitutable into a probability value.

TABLE I $$P(\text{label}(q_i, q_j) = \{1, 2\} \mid f) = \frac{1}{1 + \exp(1.85\ f(q_i, q_j) - 4.9)}$$

In the equation illustrated in Table I, $q_i$ and $q_j$ comprise a user query and a query substitutable, respectively. The probability ("P") calculated in Table I is with respect to the values {1,2}, which comprise an identification of the extent to which query $q_i$ matches or is similarly to query $q_j$. According to one embodiment of the invention, a scale of the degrees to which a given query $q_i$ matches a query $q_j$ is used to calculated the probability in Table I. For example, a scale from one ("1") through four ("4") may be used to identify the varying degrees to which a given query $q_1$ matches or is related to a query $q_j$. The value one ("1") may represent an exact or precise match between query $q_i$ and query $q_j$, whereas the value "4" may represent an inaccurate match. The degree to which query $q_i$ and query $q_j$ match may be specified in the equation illustrated in Table I. Accordingly, the probability calculated in Table I identifies the probability that query $q_i$ matches query $q_j$ to the degree specified in the equation.

A check is performed to determine whether the probability calculated for the selected query substitutable meets or exceeds a given threshold, step 506. According to one embodiment of the invention, the check performed at step 506 comprises a determination of whether the probability associated with a selected query substitutable meets or exceeds a given probability threshold. If the probability calculated for the selected query substitutable does not exceed the threshold, the selected query substitutable is removed from the query substitutable candidate set. Regardless of weather the selected query substitutable exceeds the threshold, step 506, or after the selected query substitutable has been removed from the candidate set, step 508, a check is performed to determine whether one or more additional query substitutables require analysis, step 510. If one or more additional query substitutables require analysis, a next query substitutable is selected from the candidate set, step 502.

After an analysis has been performed for the one or more query substitutables in the candidate set, the one or more query substitutables i may be used to locate content responsive to the one or more query substitutables, step 514. The content items identified as responsive to the one or more query substitutables may include, but are not limited to, web pages, documents, audio files, video files, and images. Additionally, the content identified as responsive to the one or more query substitutables may comprise one or more advertisements. The content items identified as responsive to the one or more query substitutables may be delivered to the user with from the original user query originated.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method for generating one or more related queries with respect to a given query, the method comprising:
   receiving a query comprising one or more terms;
   generating a corpus of candidate reformulations based on the received query;
   identifying one or more queries or terms from the corpus of candidate reformulations related to the received query;
   generating with a processor one or more related queries on the basis of the identified one or more queries or terms from the corpus of candidate reformulations and segmenting the received query into one or more segments;
   calculating a relevance factor by assigning a likelihood ratio score to each of the one or more related queries, the likelihood ratio indicating a degree of relatedness of the one or more related queries to the query, the likelihood ratio calculated by comparing a plurality of pair independence functions to each other, the pair independence functions being a function of a number of occurrences of the one or more related queries in the corpus of candidate reformulations; and
   comparing the relevance factor for each of the one or more related queries to a threshold and selecting therefrom at least one related query that exceeds the threshold.

2. The method of claim 1 wherein segmenting the received query comprises segmenting the received query into a plurality of terms or phrases, generating one or more related queries comprising identifying at least one other query from the candidate reformulations with a same number of segments as that of the query, selecting at least one segment from the at least one other query with the same number of segments as that of the query that differs therefrom, the selected at least one segment identified as a candidate segment-level reformulation, and replacing at least one of the plurality of terms or phrases of the query with the candidate segment-level reformulation.

3. The method of claim 1 wherein generating the corpus of candidate reformulations comprises generating a pair of successive queries of one or more terms.

4. The method of claim 1 wherein generating the corpus of candidate reformulations comprises generating a pair of successive segments of one or more terms.

5. The method of claim 1 wherein identifying comprises identifying one or more queries or terms from the corpus of candidate reformulations related to the one or more segments of the received query.

6. The method of claim 1 wherein receiving a query comprises receiving from a user of a client device.

7. The method of claim 1 wherein generating a corpus of candidate reformulations comprises:
   identifying one or more pairs of queries issued successively by one or more users of client devices; and
   generating a corpus of candidate reformulations on the basis of the one or more identified pairs of queries.

8. The method of claim 1 wherein generating a corpus of candidate reformulations comprises:
   segmenting one or more queries issued successively by one or more users of client devices;
   identifying one or more differing segments between the successively issued queries; and
   generating a corpus of candidate reformulations on the basis of the one or more segments.

9. The method of claim 1, wherein generating a corpus of candidate formulations based on the received query comprise:
   maintaining a query log including queries generated by one or more users and a time that the queries were generated; and
   identifying as candidate reformulations from the query log one or more other queries received within a duration of time from the query.

10. The method of claim 9, wherein the query is received from a user and the one or more queries identified comprise a least one successive query from the user within the duration of time.

11. The method of claim 1, comprising identifying search results in response to the query using at least one of the selected queries.

12. The method of claim 1 wherein the relevance factor is calculated further based on a score generated by linear regression for each of the one or more related queries.

13. The method of claim 1 wherein the relevance factor is calculated further based on a query substitutable type of each of the one or more related queries.

* * * * *